April 21, 1964
R. H. DRAPER
3,130,366
CURRENT AND VOLTAGE TESTER FOR ELECTRICAL APPLIANCES
OPERATING ON DIFFERENT VOLTAGES
Filed Sept. 6, 1960
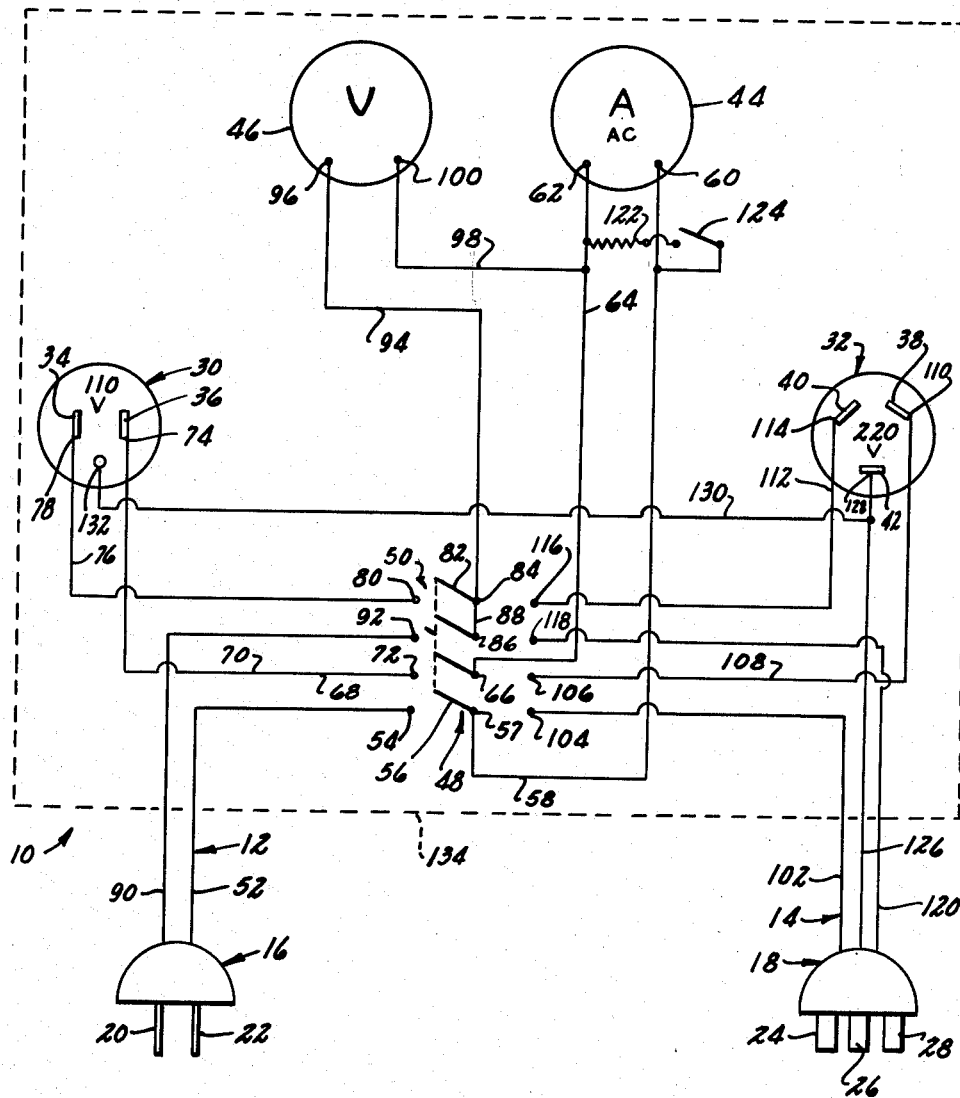
INVENTOR.
RAYMOND H. DRAPER
BY
WILSON, SETTLE, McRAE & CRAIG
ATTORNEYS

United States Patent Office 3,130,366
Patented Apr. 21, 1964

3,130,366
CURRENT AND VOLTAGE TESTER FOR ELECTRICAL APPLIANCES OPERATING ON DIFFERENT VOLTAGES
Raymond H. Draper, 19944 Northrop, Detroit 19, Mich., assignor of one-half to George Parsons
Filed Sept. 6, 1960, Ser. No. 54,002
1 Claim. (Cl. 324—149)

This invention relates to testing apparatus for electrical appliances and more particularly to a single instrument for testing the current used by, and the voltage drop across, different pieces of apparatus operating on different voltages.

In the repair and maintenance of electrical apparatus, such as home appliances and electrical machinery, the service man is frequently called upon to check the power characteristics of pieces of apparatus operating on different voltages. Conventionally, the service man will deal with apparatus operating on 110 volts and apparatus operating on 220 volts. In the past, it has been necessary for the service man to have two different testing instruments, one to check the 110 volt equipment and one to check the 220 volt equipment. This is undesirable both from the standpoint of the expense of the dual equipment and also the inconvenience of carrying two separate pieces of equipment.

The present invention solves this problem by providing a single instrument for the testing of both 110 volt and 220 volt equipment and which is foolproof in operation in that the wrong voltage cannot be applied to a piece of apparatus under test.

An object of the invention is to provide a single tester for electrical apparatus which operates on different voltages.

Another object of the invention is to provide a tester having a novel switching arrangement which permits the use of a single voltmeter and a single ammeter for testing 220 and 110 volt apparatus.

A further object of the invention is to provide such an electrical testing device which is foolproof in operation in that an improper voltage cannot be applied to the apparatus under test.

Other objects of this invention will appear in the following description and appended claim, reference being had to the accompanying drawings forming a part of this specification wherein like reference characters designate corresponding parts in the several views.

In the drawings:
The figure is a schematic illustration of one embodiment of the tester of the present invention Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the figure, it will be seen that the tester 10 has two power cables 12, 14 for connection to two different power supplies, for example, 110 volt and 220 volt power supplies. Each of the cables 12, 14 terminates in a plug element 16, 18 for insertion into a conventional power outlet receptacle. Each of the plug elements has a different configuration whereby each is receivable in a different outlet receptacle. As will be noted, the plug 16 has two prongs 20, 22 in substantially parallel alignment while the plug 18 has three prongs 24, 26, 28 each of which is oriented at an angle to the others. The use of such plugs and the associated receptacles is standard in the field. This standard is used to advantage in this invention to insure that an improper connection is not made. An improper connection, resulting in the wrong voltage being applied to apparatus under test, could cause extensive damage to the apparatus and thus it is highly desirable to avoid the possibility of such a mistake being made.

A plug receptacle 30, 32 is associated, respectively, with each power cable 12, 14. The receptacles 30, 32 each have a different configuration whereby an appliance plug receivable in one is not receivable in the other. The receptacle 30 has two prong-openings 34, 36 for receiving a plug such as the plug 16. The receptacle 32 has three prong-openings 38, 40, 42 for receiving a plug such as the plug 18.

Metering means comprising an ammeter 44 and a voltmeter 46 are provided for measuring the electrical power characteristics (current and voltage) of the electrical apparatus under test. The circuit is completed by the switch means comprising two double pole, double throw switches 48, 50 for selectively interconnecting one of the power cables 12, 14, its associated appliance receptacle 30, 32 and the metering means 44, 46.

Considering first the circuit for testing 110 volt equipment, it will be noted that one input power lead 52 is connected to post 54 of switch 48. Assuming the switch arm 56 to be thrown to the left, the current path is then through line 58 which is connected to terminal 60 of the ammeter 44. Terminal 62 of the ammeter has lead 64 which is connected to pole 66 of the switch 48. Power is then supplied to the receptacle 30 by means of lead 70 which connects terminal post 72 of the switch 48 to terminal 74 of the receptacle. Lead 76 extends from the second terminal 78 of the receptacle back to post 80 of the second switch 50 thence through switch arm 82 to pole 84. Pole 84 is connected to pole 86 by lead 88. The second power lead 90 connects to post 92 of switch 50 which is connected to pole 86 by means of switch arm 82. It is thus seen that a circuit is completed through the receptacle 30 and the ammeter 44 when the switches are thrown to the left. For the sake of convenience, the switches are ganged together so that a single throw will operate both switches.

The voltmeter 46 is connected across the power source and receptacle 30 by means of lead 94 extending from terminal 96 of the voltmeter to pole 84 of switch 50 and a second lead 98 extending from terminal 100 and connected to lead 64 which extends from the ammeter.

Considering next the circuit for testing 220 volt equipment, it will be assumed that the switches 48, 50 are thrown to the right. It will be noted that power lead 102 of cable 14 extends to post 104 of switch 48. Current paths are then through the switch arm 56 to pole 57 from which extends the lead 58 which is connected to the ammeter as previously explained. The return lead 64 from the ammeter is connected through switch arm 56 to post 106. Lead 108 extends from the post 106 to terminal 110 of the second receptacle 32. Lead 112 extends from terminal 114 of the receptacle back to post 116 of switch 50. The path is then through switch arm 82 to post 118 of switch 50 which is connected to the second power lead 120 to thus complete the circuit through receptacle 32 and the ammeter. The voltmeter is connected across the input leads 102, 120 as prevoiusly explained.

A shunt resistor 122 may be conventionally provided in parallel with the ammeter to increase the range of this meter. Closure of the switch 124 to put this resistor in the circuit will change the range of the meter, for example, from 0 to 15 amps to a range of from 0 to 45 amps.

A third lead is provided in the power cable 14 to act as a ground. Lead 126 extends to terminal 128 of receptacle 32. A branch lead 130 extends from lead 126 to terminal 132 of the receptacle 30 to thus ground both receptacles and prevent a dangerous condition from existing on the tester or the appliance under test.

In operation of the tester, the user cannot make the mistake of applying the wrong voltage to an appliance under test. For example, in order to test an appliance using receptacle 30, the appliance plug must have only two prongs oriented in substantially parallel planes. Such prongs are provided only for 110 volt apparatus. Similarly, the plug 16 must be inserted into a 110 volt outlet receptacle. If both of these conditions are met, throwing of the switches to the left will apply power to the appliance, and the voltage drop across the appliance and current supplied thereto will register on the meters. If the switches are thrown to the right, completing a circuit through the 220 volt power cable, no power will be applied to the appliance under test. The reverse situation is, of course, true for the receptacle 32 and plug 18.

The portion of the circuit enclosed by dotted line 134 may be suitably housed in an enclosure. Preferably, the faces of the voltmeter and ammeter are readily visible from the exterior of the enclosure and the receptacles 30, 32 are arranged to conveniently receive the plug of an appliance.

In the description of the invention, reference has been made to 110 and 220 volt systems. However, it will be appreciated that other voltages could be used within the scope of the invention.

Having thus described my invention, I claim:

A tester for electrical apparatus operating on different voltages comprising first and second power cables each comprising a pair of leads; each of the power cables being for connection to different voltages; first and second receptacles each having a pair of terminals; each of said receptacles having a different configuration whereby a plug receivable in one is not receivable in the other; said receptacles being each associated with one of the power cables and adapted to receive a plug of an electrical apparatus; a voltmeter having a pair of terminals; an ammeter having a pair of terminals; and switching means for selectively interconnecting one of the power cables, its associated receptacle, the voltmeter and the ammeter; said switching means including first and second double pole, double throw switches each having a pair of poles and two pairs of posts; one post of one pair of the first switch being connected to one lead of the first power cable; the other post of said one pair of the first switch being connected to one terminal of the first receptacle; one post of the second pair of posts of the first switch being connected to one lead of the second power cable; the other post of said second pair being connected to one terminal of the second receptacle; one pole of said one pair of the first switch being connected to one terminal of the voltmeter and also to one terminal of the ammeter; the other pole of said pair of the first switch being connected to the second terminal of the ammeter; one post of one pair of the second switch being connected to the second lead of the first power cable; the second post of said one pair of the second switch being connected to the second terminal of the first receptacle; said two poles of said second switch being connected together and also connected to the second terminal of the voltmeter; one post of the second pair of the second switch being connected to the second lead of the second power cable; and the second post of the second pair of the second switch being connected to the second terminal of the second receptacle.

References Cited in the file of this patent

UNITED STATES PATENTS

| | | |
|---|---|---|
| 1,606,063 | Edwards | Nov. 9, 1926 |
| 2,010,047 | Green | Aug. 6, 1935 |
| 2,583,424 | Haslett | Jan. 22, 1952 |
| 2,597,188 | Rozett | May 20, 1952 |
| 2,858,507 | Liautaud | Oct. 28, 1958 |